J. CONLEY.
GARBAGE RECEPTACLE.
APPLICATION FILED JUNE 18, 1907.
930,842.
Patented Aug. 10, 1909.
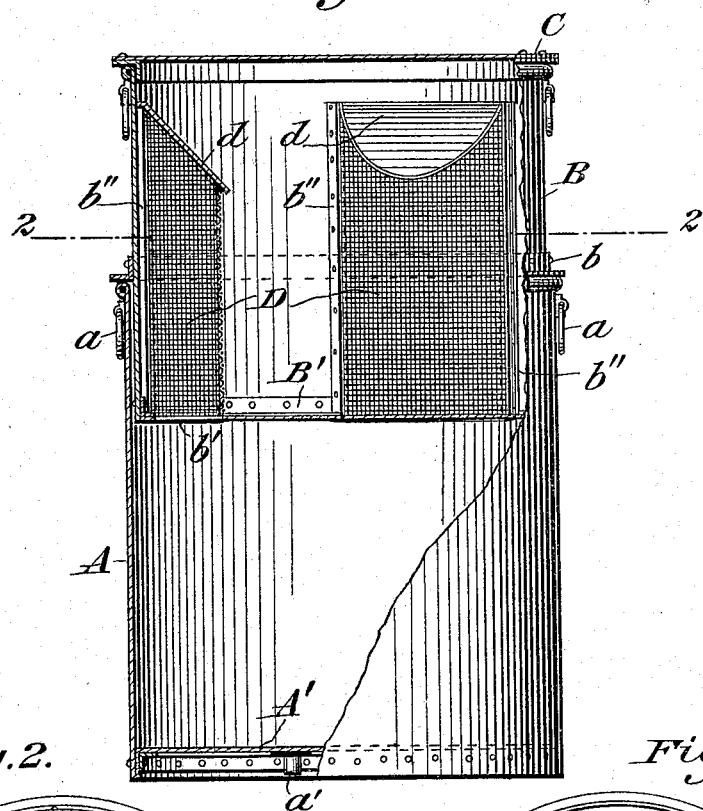
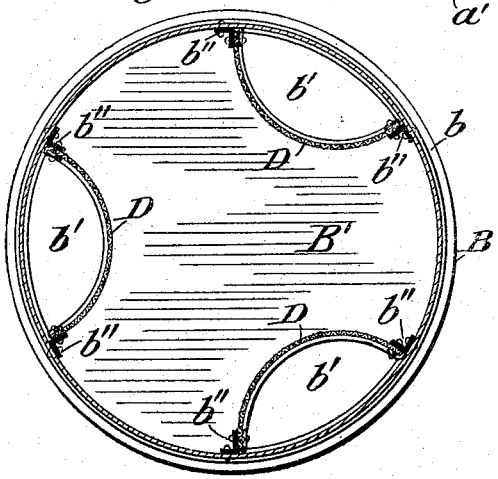
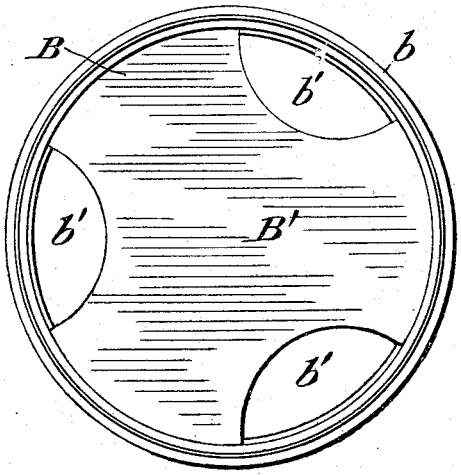
Witnesses:
Alex Scott
D. W. Edelin
Inventor:
Joseph Conley
By Eugene W. Johnson
Atty.

UNITED STATES PATENT OFFICE.

JOSEPH CONLEY, OF ANADARKO, OKLAHOMA.

GARBAGE-RECEPTACLE.

No. 930,842.　　　Specification of Letters Patent.　　　Patented Aug. 10, 1909.

Application filed June 18, 1907. Serial No. 379,531.

*To all whom it may concern:*

Be it known that I, JOSEPH CONLEY, a citizen of the United States, residing at Anadarko, in the county of Caddo, Oklahoma, have invented new and useful Improvements in Garbage - Receptacles, of which the following is a specification.

This invention appertains to certain new and useful improvements in receptacles for garbage, of the type shown in my Patent Number 621,601, dated March 21, 1899.

A garbage receptacle made in accord with my present invention comprises a lower receptacle for liquid and an upper receptacle in which the garbage is placed, such upper receptacle having a bottom that is cut away to provide adjacent to its outer edge a plurality of openings, and adjacent to the openings the side of the receptacle has attached thereto vertical strips or angle bars that hold in place strainers, the upper ends of the strainers being closed by inclined tops. The exterior of the upper receptacle carries a flanged band that engages the upper edge of the liquid container, and the cover for the upper receptacle is of such size that it may be used with either receptacle.

A garbage receptacle made in accord with my invention is particularly adapted to be used wherever it is desired to separate the liquid from the solid matter, so that the solid matter may be removed in carts, or carried to an incinerator, the liquid being allowed to enter a sewer, or to be otherwise disposed of.

In the accompanying drawings, Figure 1 is a part section and side view of a garbage receptacle made in accord with my invention. Fig. 2 is a horizontal section on the line 2—2; and Fig. 3 is an inverted plan view of the upper section of the receptacle.

Referring to the accompanying drawings, A is the lower or liquid receptacle, the same being of any suitable construction though in practice I prefer to make the same of sheet metal, and provide the same with handles $a$, $a$, and bottom $A'$ of the liquid receptacle is provided with an outlet pipe $a'$, which may be closed by a cap or plug.

The upper vessel or receptacle is of less diameter than the lower vessel and is provided at a considerable distance above its bottom with a flanged band $b$, that is adapted to bear upon the upper edge of the vessel A, and support the receptacle B, so that a considerable part thereof will depend within the vessel A. The cover C is of such a size that it may be used to close either vessel.

The sheet metal bottom $B'$ of the vessel B, is cut away as shown to provide a plurality of openings $b'$, and to the inner side of the receptacle so as to extend upward from the ends of the openings are angular strips $b''$, that form supports for the vertical edges of strainers D. The strainers may be either wire fabric or perforated sheet-metal plates, they being curved in cross section and provided at the upper ends with solid covering plates $d$, that incline from the inner wall of the vessel B downward, so that the garbage will not rest thereon when dumped into the vessel. The radially placed strainers and their inclined covers $d$ may be either fixedly secured in place or they may be held in place by their own resiliency and by the pressure of the garbage thereon.

The device may be manufactured so that the upper vessel can be applied to garbage cans of standard sizes and construction, and the particular construction and arrangement of the strainers provides efficient means for separating the fluid from the solid parts of garbage, and the strainers are not liable to injury in handling the vessel or in placing garbage therein.

In practice I prefer to provide the vessel or receptacle B with three vertical strainers which are spaced at equal distances apart, the length of the strainers being less than the length or height of the can or vessel B, and the inclination of the tops $d$ should not be less than forty-five degrees. The sides of the strainers being convex and the vertical edges being held by the strips $b''$, provides a construction that will resist the pressure of the garbage thereon, as well as providing each vessel with several strainers.

Having thus set forth my invention what I claim as new and desire to secure by Letters Patent, is:

1. In a garbage receptacle, a vessel adapted to be supported upon a receptacle of larger diameter and to depend partly within the same, comprising a garbage receiving vessel having a bottom with a plurality of openings therethrough, a plurality of strainers which extend upward from the bottom each strainer having an inclined and imperforate top, substantially as shown.

2. In a garbage receptacle, a receiving vessel provided with a plurality of radially arranged and vertically extending strainers, inclined tops attached to the strainers and openings through the bottom of the vessel said openings being below the part of the receptacle inclosed by the strainers.

3. In a garbage receptacle for the purpose of separating liquids from the solid matter, a liquid container, a vessel adapted to receive garbage which is of less diameter than the liquid container, a supporting and reinforcing band attached to the garbage container, a plurality of openings through the bottom of the garbage container, a series of strainers which extend from the openings upward said strainers terminating below the upper edge of the vessel each strainer having a downward and inward extending top, substantially as shown.

4. In a garbage receptacle, the combination with a vessel that is adapted to hold fluids, of a receptacle of less diameter than the vessel, an exterior flange on the receptacle for engagement with the upper edge of the vessel, a bottom for the receptacle having therethrough a plurality of openings, a plurality of strainers that extend upward above the openings the vertical edges of the strainers being attached to the receptacle and inclined tops for each of the strainers.

5. In a device of the character set forth, the combination with a cylindrical vessel, of a receptacle adapted to partially telescope within said vessel, radial openings through the bottom of the receptacle, a plurality of curved strainers attached along their vertical edges to the receptacle and inclined covers for each of the vertically disposed strainers.

In testimony whereof I have hereunto set my hand in presence of two subscribing witnesses.

JOSEPH CONLEY.

Witnesses:
 EUGENE W. JOHNSON,
 E. E. WEBB.